(12) United States Patent
Plottnik

(10) Patent No.: US 6,571,511 B1
(45) Date of Patent: Jun. 3, 2003

(54) FORCE-RESPONSIVE DETECTORS AND SYSTEMS AND METHODS OF MAKING THEM

(75) Inventor: Reimund Plottnik, Viersen (DE)

(73) Assignee: Draftex Industries Limited, Edinburgh (GB)

( * ) Notice: Subject to any disclaimer, the term of this patent is extended or adjusted under 35 U.S.C. 154(b) by 0 days.

(21) Appl. No.: 09/623,642

(22) PCT Filed: Oct. 29, 1998

(86) PCT No.: PCT/GB98/03222

§ 371 (c)(1),
(2), (4) Date: Nov. 21, 2000

(87) PCT Pub. No.: WO99/46469

PCT Pub. Date: Sep. 16, 1999

(30) Foreign Application Priority Data

Mar. 11, 1998 (GB) .............................................. 9805202

(51) Int. Cl.⁷ ............................................... E05F 15/02
(52) U.S. Cl. ............................. 49/26; 49/28; 200/61.44; 200/61.73
(58) Field of Search .................... 49/26, 28; 200/61.44, 200/61.43, 61.42, 61.41, 61.62, 61.7, 61.71, 61.73, 61.74, 61.76, 61.78, 61.81, 61.82, 511, 85 R, 86 R

(56) References Cited

U.S. PATENT DOCUMENTS

| | | | | | |
|---|---|---|---|---|---|
| 4,532,388 A | * | 7/1985 | Sackmann et al. | ........ | 200/61.43 |
| 4,621,223 A | | 11/1986 | Murakami et al. | | |
| 4,634,917 A | * | 1/1987 | Dvorsky et al. | ............ | 310/328 |
| 4,811,133 A | * | 3/1989 | Nakadai et al. | .......... | 360/77.03 |
| 5,167,432 A | | 12/1992 | Buttner et al. | | |
| 5,543,589 A | * | 8/1996 | Buchana et al. | .............. | 178/18 |
| 5,565,657 A | * | 10/1996 | Merzq | .......................... | 178/18 |
| 5,623,760 A | * | 4/1997 | Newham | ...................... | 29/622 |
| 5,834,719 A | * | 11/1998 | Kaji et al. | ............... | 200/61.44 |
| 6,281,455 B1 | * | 8/2001 | Plottnik et al. | .......... | 200/61.44 |

FOREIGN PATENT DOCUMENTS

| | | |
|---|---|---|
| DE | 197 06 481 A1 | 9/1977 |
| DE | 297 10 499 U1 | 9/1997 |
| EP | 0 446 997 A2 | 9/1991 |
| EP | 0 669 229 A2 | 8/1995 |
| GB | 1358006 | 6/1974 |
| GB | 1369174 | 10/1974 |
| GB | 2225660 A | 6/1990 |

\* cited by examiner

*Primary Examiner*—Jerry Redman
(74) *Attorney, Agent, or Firm*—Leydig, Voit & Mayer, Ltd.

(57) ABSTRACT

A force-responsive sensor comprises upper and lower cover layers, the upper layer being resilient and flexible and shown as transparent for ease of illustration. An electrically conductive layer carries separate individual electrically insulating spacers which separate it from two electrically conductive members. Each of these members has a plurality of spaced resilient fingers, the fingers of the two members being inter-digitated. The members are formed as films on the layer. Where the members are not supported by the spacers, they are normally held apart from the conductive layer by the resilience of the upper layer. In response to an applied force, one or more of the fingers is pressed into contact with the conductive layer to enable the production of a corresponding electrical signal. The positioning of the spacers ensures that they do not increase the overall width of the sensor. A force applied by a relatively large-area flat object is transmitted by a protruberance to one of the fingers. There may be a plurality of protruberances spaced apart along the sensor. The sensor may be used in a safety system for detecting obstructions in a window opening having a motor-slidable window glass.

26 Claims, 4 Drawing Sheets

FORCE-RESPONSIVE DETECTORS AND SYSTEMS AND METHODS OF MAKING THEM

BACKGROUND OF THE INVENTION

The invention relates to a force-responsive longitudinally extending sensor, comprising first longitudinally extending electrically conductive means, second electrically conductive means superimposed on the first means, electrically insulating means positioned between and spacing the first means from longitudinally distributed parts of the second means, respective remaining parts of the second means being longitudinally distributed along the sensor and normally being resiliently held spaced apart from the first means but each being able to be flexed independently of the other remaining parts and against the resilience into contact with the first means in response to a force applied to that remaining part whereby to enable a force-responsive output to be produced, and means defining protruding means extending transversely to the longitudinal extension of the sensor and outwardly of the second means in a direction away from the first means for receiving a force and transmitting it to the remaining parts.

Such a sensor is shown, for example, in DE-A-197 06 481. In this sensor, the second electrically conductive means is of ladder-like configuration with parallel side pieces extending along the length of the sensor and electrically insulated by insulating means from the first electrically conductive means. The cross pieces of the ladder-like configuration of the second electrically conductive means extend resiliently across gaps in the electrically insulating means so that they can be pressed into respective electrical contact with the first electrically conductive means in response to a force applied to anyone or more of them individually.

However, if a force is applied over an area encompassing the side pieces and a plurality of the cross pieces of the ladder-like configuration of the second electrically conductive means, the necessary force applied individually to one.of the cross pieces, for flexing it into contact with the first electrically conductive means, may not be produced. Therefore, the sensor may not produce any output in response to the force. The invention aims to deal with this problem.

Such a sensor as first set forth above is also known from U.S. Pat. No. 4,621,223. This document shows a sensor in which parallel side by side first and second electrically conductive layers are formed on the same surface of an electrically insulating sheet which is folded over to present the conductive layers to each other with a longitudinally extending electrical insulator of ladder-like configuration between them. An externally applied force can flex part of the first conductive layer into contact with the second conductive layer through one of the gaps in the insulator. However, if such a force is applied over a relatively large area, it may not be able to produce such contact because the cross pieces of the ladder-like configuration of the insulator will prevent the necessary flexing of the first conductive layer.

SUMMARY OF THE INVENTION

According to the invention, therefore, the sensor as first set forth above is characterised in that the or each protruding means is positioned in alignment with a respective one, only, of the remaining parts for receiving a force applied over an area encompassing a plurality of the remaining parts and transmitting that force to that one of the remaining parts.

Force-responsive sensors and systems embodying the invention, and window safety systems embodying the invention and for use in motor vehicles, will now be described, by way of example only, with reference to the accompanying diagrammatic drawings in which:

DESCRIPTION OF THE PREFERRED EMBODIMENTS

Figure 1:
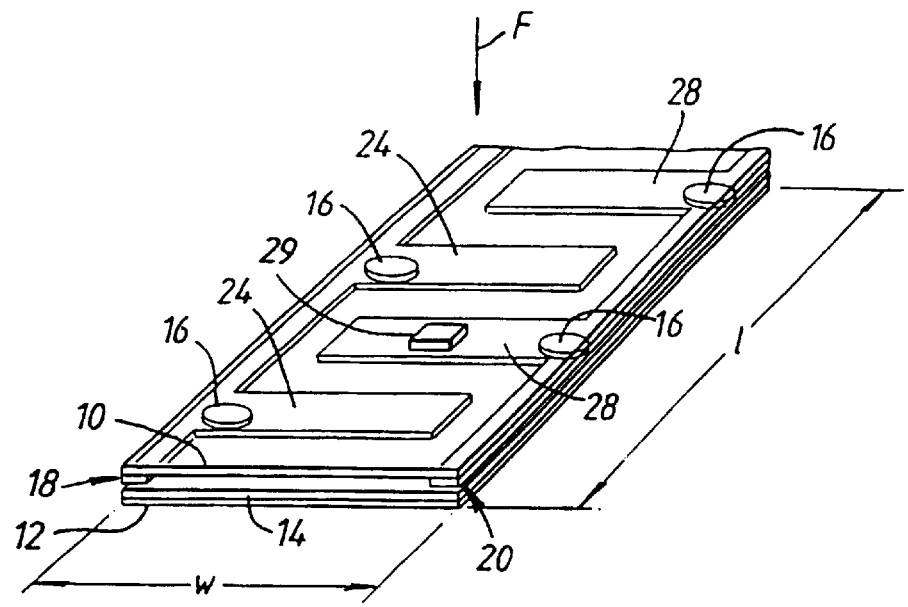
FIG. 1 is a perspective view of one of the sensors.
Figure 2:
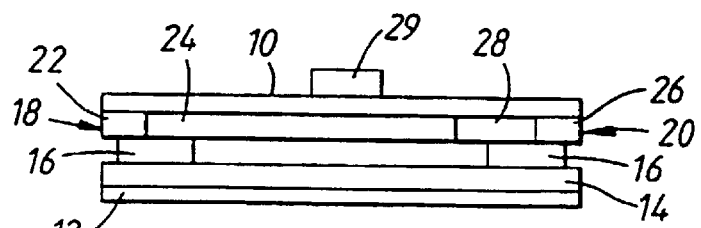
FIG. 2 is an enlarged end view of the sensor of FIG. 1.
Figure 3:
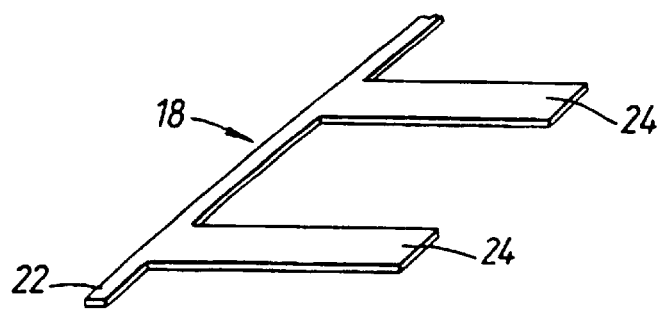
FIG. 3 is a perspective view of an electrically conductive member used in the sensor of FIGS. 1 and 2.
Figure 4:
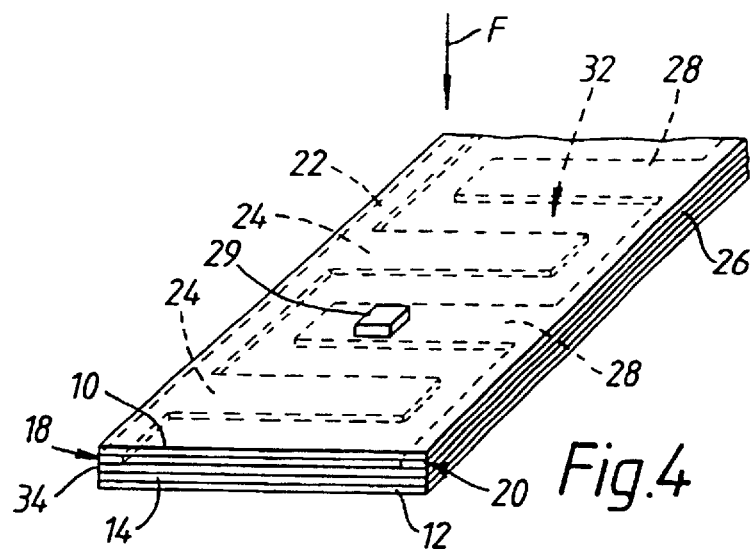
FIG. 4 is a perspective view of another of the sensors.
Figure 5:
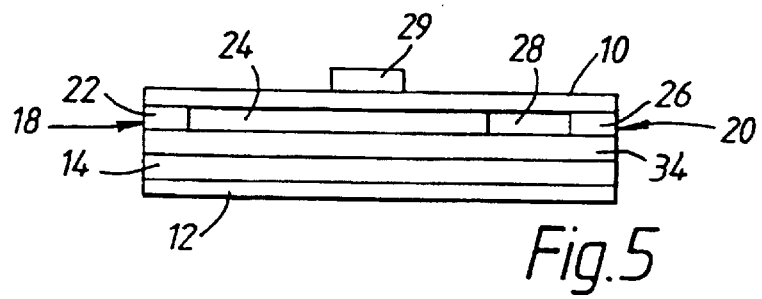
FIG. 5 is an enlarged end view of the sensor of FIG. 4.
Figure 6:
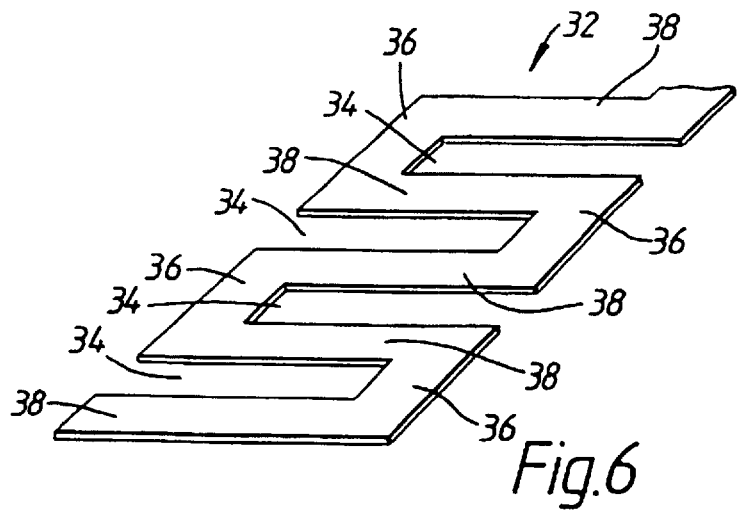
FIG. 6 is a perspective view of an electrically insulating spacer used in the sensor of FIG. 4.
Figure 7:
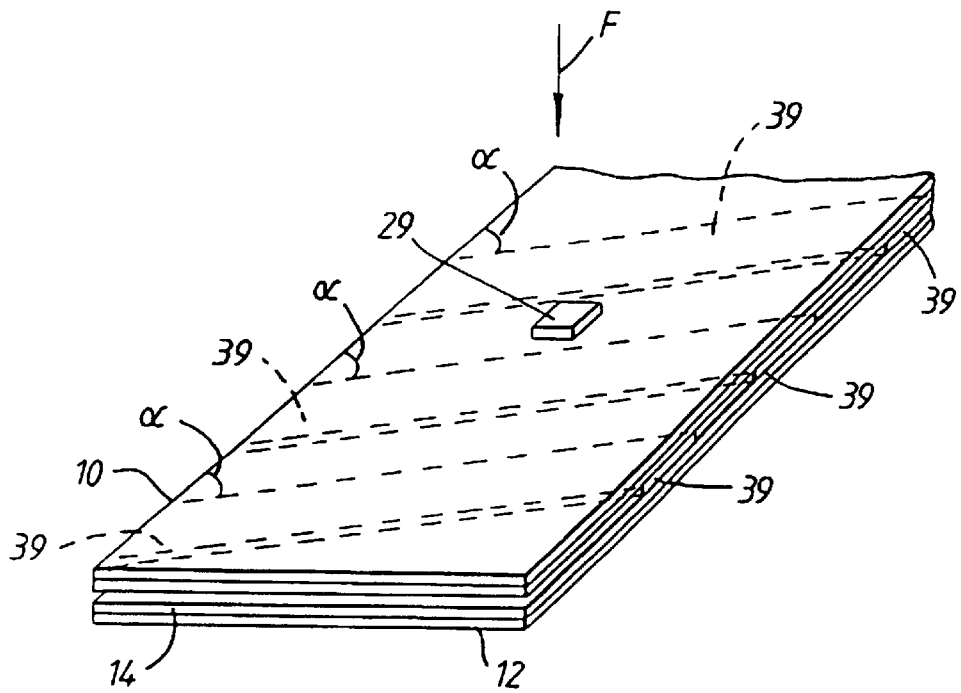
FIG. 7 is a perspective view of a further one of the sensors.
Figure 8:
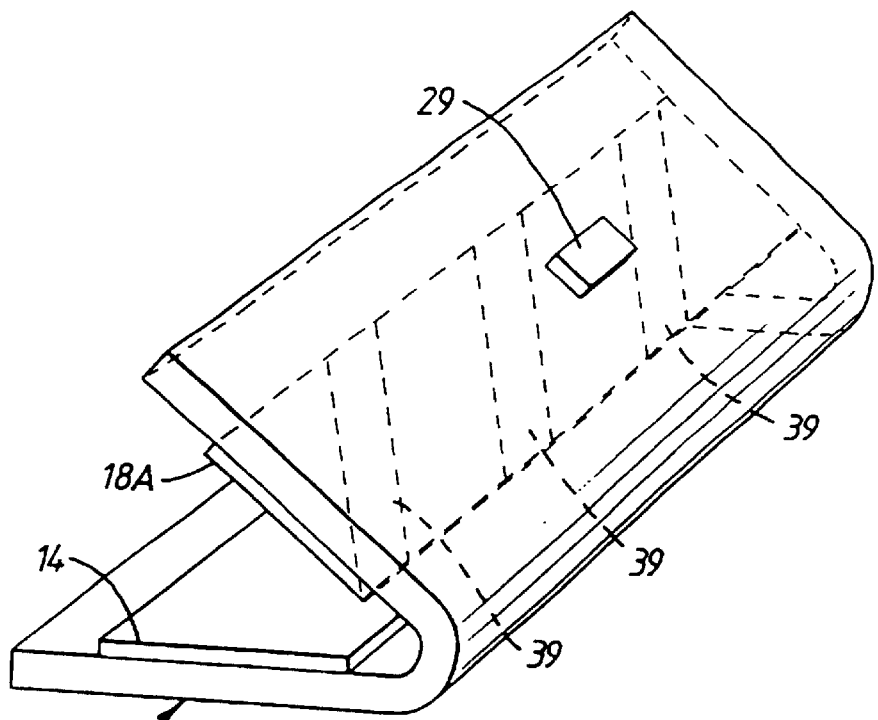
FIG. 8 is a perspective view of a modified form of the sensor of FIG. 7 during a stage in its manufacture.
Figure 9:
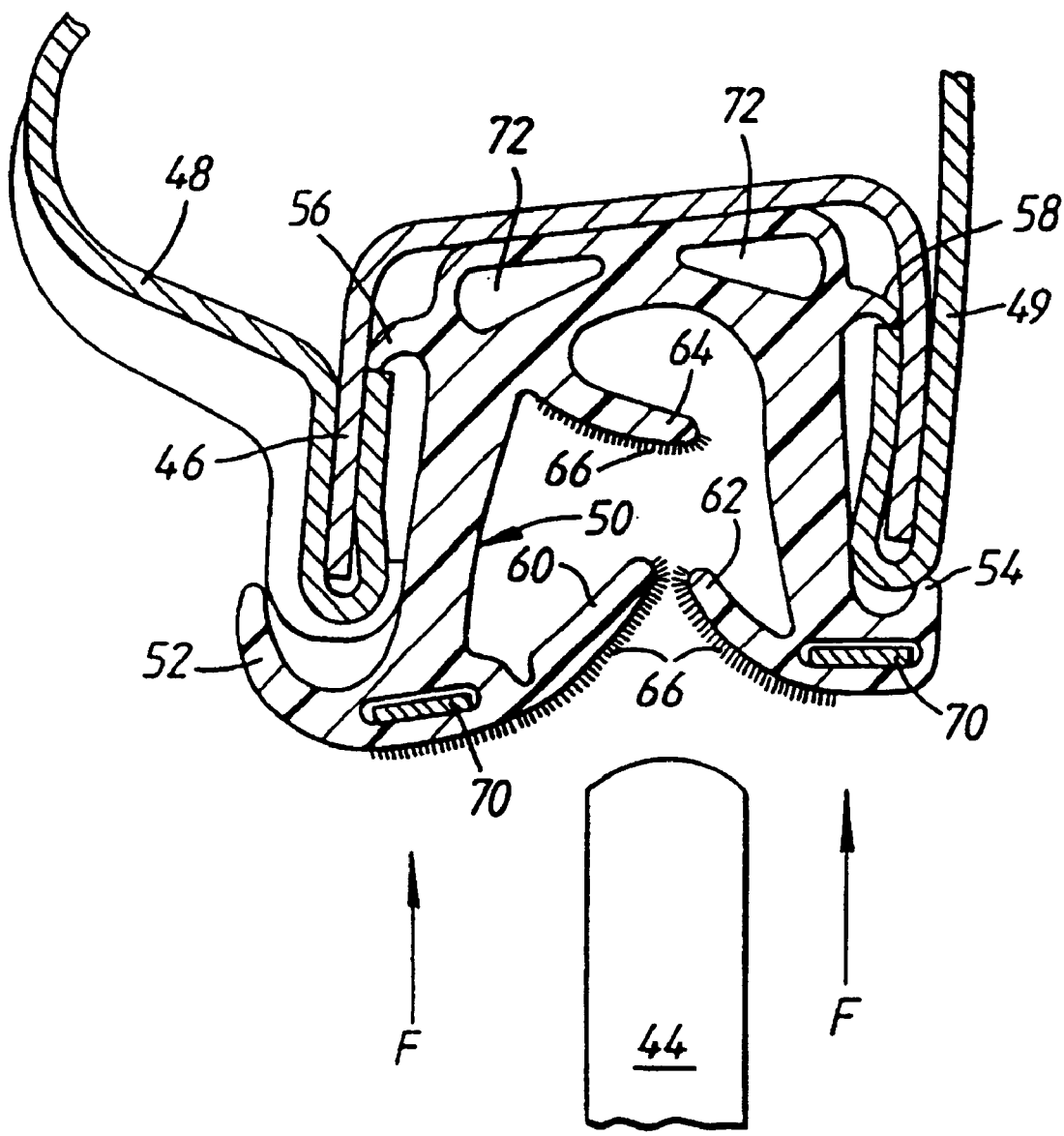
FIG. 9 is a cross-section of a window channel embodying one of the sensors and fitted to the window frame of a motor vehicle.

FIGS. 1, 2 and 3 show one of the sensors. It is of indeterminate length 1 and predetermined width w. In response to a force applied to it at individual points along its surface and in a direction perpendicular, or at least transverse, to the plane 1w, it produces an electrically detectable signal.

As shown in FIGS. 1 and 2, the sensor has a rectangular cover layer 10 which is made of flexible and resilient electrically.

What is claimed is:

1. A force-responsive sensor having a length extending in a longitudinal direction and a width, comprising:

first longitudinally extending electrically conductive means, second electrically conductive means superimposed on the first electrically conductive means, the second electrically conductive means having longitudinally distributed parts and a plurality of remaining parts, electrically insulating means positioned between and spacing the first electrically conductive means from the longitudinally distributed parts of the second electrically conductive means, the respective remaining parts of the second electrically conductive means being longitudinally distributed along the sensor and normally being resiliently held spaced apart from the first electrically conductive means, but each one of said remaining parts being able to be flexed independently of other ones of the remaining parts and into contact with the first electrically conductive means in response to a force applied to said one of the remaining parts to enable a force-responsive output to be produced, and means defining protruding means extending transversely to the longitudinal direction of the sensor and outwardly of the second electrically conductive means in a direction away from the first electrically conductive means and in alignment with a single selected said remaining part of the remaining parts for receiving a force applied over an area encompassing the plurality of the remaining parts and transmitting said force applied over an area to the selected said remaining part.

2. The sensor according to claim 1, wherein said electrically insulating means comprises a plurality of discrete insulating means spaced longitudinally apart.

3. The sensor according to claim 2, wherein the first electrically conductive means comprises an electrically conductive layer of generally rectangular configuration with the electrically insulating means placed thereon and overlain by the second electrically conductive means, the electrically insulating means and the second electrically conductive means lying within the width of the conductive layer, the second electrically conductive means comprising a layer substantially coextensive with said electrically conductive layer.

4. The sensor according to claim 3, wherein each of the discrete insulating means extends across the width of the sensor.

5. The sensor according to claim 4, wherein each of the discrete insulating means is positioned at an oblique angle to the longitudinal direction of the sensor.

6. The sensor according to claim 1, wherein the remaining parts of the second electrically conductive means comprise fingers extending generally perpendicular to the longitudinal direction and extending over the first electrically conductive means.

7. The sensor according to claim 1, wherein the second electrically conductive means comprises a plurality of electrically conductive strips extending parallel to each other and arranged side by side but with spaces between them along the longitudinal direction of the sensor, the strips being connected to a conductor extending longitudinally of the sensor.

8. The sensor according to claim 7, wherein the electrically insulating means comprises a plurality of discrete insulating spacers positioned between at least some of the electrically conductive strips and the first electrically conductive means.

9. The sensor according to claim 8, wherein the strips are formed on a flexible resilient layer.

10. The sensor according to claim 7, wherein the electrically conductive strips are formed on a flexible resilient layer, and the electrically insulating means comprises insulating material positioned at the spaces between the electrically conductive strips and separating the flexible layer from the first electrically conductive means, the electrically conductive strips being held from the first electrically conductive means by the flexible resilient layer until the flexible resilient layer is flexed towards the first electrically conductive means by said force applied over an area.

11. The sensor according to claim 10, wherein the electrically insulating means comprises an electrically insulating layer positioned between the first electrically conductive means and the flexible resilient layer, the electrically insulating layer being provided with gaps corresponding with positions of the electrically conductive strips to enable the electrically conductive strips to flex therethrough into contact with the first electrically conductive means in response to the force applied over an area.

12. The sensor according to claim 7, wherein the electrically conductive strips comprise fingers extending from the conductor.

13. The sensor according to claim 12, wherein there are two conductors extending longitudinally of the sensor and parallel to each other and spaced apart, some of the fingers extending from one of the conductors and the other fingers extending from the other conductor, the fingers being interdigitated.

14. The sensor according to claim 7, wherein the electrically conductive strips comprise fingers extending from the conductor and in that the electrically insulating means comprises discrete insulating means, each said discrete insulating means being positioned adjacent a root of a respective one of the fingers.

15. The sensor according to claim 1, wherein the first electrically conductive means comprises an electrically conductive layer of generally rectangular configuration with the electrically insulating means placed thereon and overlain by the second electrically conductive means, the electrically insulating means and the second electrically conductive means lying within the width of the conductive layer.

16. The sensor according to claim 1, wherein said first electrically conductive means and said second electrically conductive means are applied using a printed-circuit technique.

17. The sensor according to claim 1, wherein the protruding means is positioned on said selected said remaining part of the second electrically conductive means.

18. The sensor according to claim 1, characterised by a flexible cover layer superimposed over the second electrically conductive means and for receiving said force applied over an area.

19. The sensor according to claim 18, including a second cover layer, the second cover layer being positioned on a side of the first electrically conductive means opposite to the second electrically conductive means, whereby the first electrically conductive means, the second electrically conductive means and the electrically insulating means are sandwiched between the two cover layers.

20. The sensor according to claim 19, wherein the two cover layers formed by a folded-over sheet of material.

21. The sensor according to claim 1, comprising a flexible cover layer superimposed over the second electrically conductive means, said area encompassing the plurality of the remaining parts, encompassing part of the flexible cover layer, and wherein said protruding means is positioned on the flexible cover layer to extend outwardly therefrom.

22. The sensor according to claim 1, comprising a plurality of the protruding means positioned at intervals along the length of the sensor.

23. A safety system for detecting an obstruction in a frame defining an opening closable by a slidable closure member, the slidable closure member being driven by a motor for providing motor-driven movement of the slidable closure member, wherein the sensor according to any preceding claim mounted on or adjacent the frame of the opening and so positioned that said force applied over an area is applied thereto when the obstruction within the opening is carried towards the frame by the slidable closure member, and control means responsive to contact between the second electrically conductive means and the first electrically conductive means to arrest the motor-driven movement of the slidable closure member.

24. The system according to claim 23, wherein the framed opening is a window opening and the slidable closure member is a pane of window glass.

25. The system according to claim 24, wherein the window opening is a window opening in a motor vehicle.

26. A force-responsive sensor extending in a longitudinal direction, comprising:
first longitudinally extending electrically conductive means,
second electrically conductive means superimposed on the first electrically conductive means, the second electrically conductive means having longitudinally distributed parts and a plurality of remaining parts, said remaining parts having inherent resilience, electrically insulating means positioned between and spacing the first electrically conductive means from the longitudinally distributed parts of the second electrically conductive means, the respective remaining parts of the second electrically conductive means being longitudinally distributed along the sensor and normally being resiliently held spaced apart from the first electrically conductive means by said inherent resilience, but each one of said remaining parts being able to be flexed independently of other ones of the remaining parts and into contact with the first electrically conductive means in response to a force applied to said one of the remaining parts to enable a force-responsive output to be produced, and means defining protruding means extending transversely to the longitudinal direction of the sensor and outwardly of the second electrically conductive means in a direction away from the first electrically conductive means and in alignment with a single selected said remaining part for receiving a force applied over an area encompassing the plurality of the remaining parts and the longitudinally distributed parts, and for transmitting said force applied over an area to the selected remaining part.

* * * * *